United States Patent [19]

Sevennec

[11] Patent Number: 5,682,970
[45] Date of Patent: Nov. 4, 1997

[54] CLUTCH MODULE HAVING A COVER PLATE ATTACHED TO THE FLYWHEEL BY MEANS OF A BAYONET TYPE FITTING

[75] Inventor: Michelle Sevennec, Sainte Gemme, France

[73] Assignee: Valeo, Paris, France

[21] Appl. No.: 481,499

[22] PCT Filed: Nov. 8, 1994

[86] PCT No.: PCT/FR94/01300

§ 371 Date: Jul. 10, 1995

§ 102(e) Date: Jul. 10, 1995

[87] PCT Pub. No.: WO95/13485

PCT Pub. Date: May 18, 1995

[30] Foreign Application Priority Data

Nov. 9, 1993 [FR] France ................. 93 13336

[51] Int. Cl.[6] ........................................ F16D 11/04
[52] U.S. Cl. ........................ 192/70.11; 192/70.27; 192/89.23
[58] Field of Search ................ 192/70.11, 70.27, 192/89.23, 112

[56] References Cited

U.S. PATENT DOCUMENTS

| 3,499,512 | 3/1970 | Maurice . |
| 4,362,230 | 12/1982 | Corral . |
| 4,600,092 | 7/1986 | Billet et al. ................. 192/70.11 |
| 5,143,190 | 9/1992 | Westendorf et al. ......... 192/70.11 X |

FOREIGN PATENT DOCUMENTS

| 2525934 | 4/1983 | France . |
| 2191832 | 12/1987 | United Kingdom ........... 192/89.23 |
| 2193271 | 3/1988 | United Kingdom . |

*Primary Examiner*—Andrea L. Pitts
*Attorney, Agent, or Firm*—Longacre & White

[57] ABSTRACT

A clutch module including a clutch mechanism (11), a clutch friction disk (12) and a flywheel (13). The clutch mechanism (11) includes a cover (14) for securement to the flywheel (13). A Bayonet-type mounting (39) is interposed between the cover (14) and the flywheel (13). The bayonet mounting includes engagement lips (41) formed on the cover (14), and bosses (42) with grooves (44) formed on the flywheel (13). The lips (41) engage the grooves (44).

6 Claims, 1 Drawing Sheet

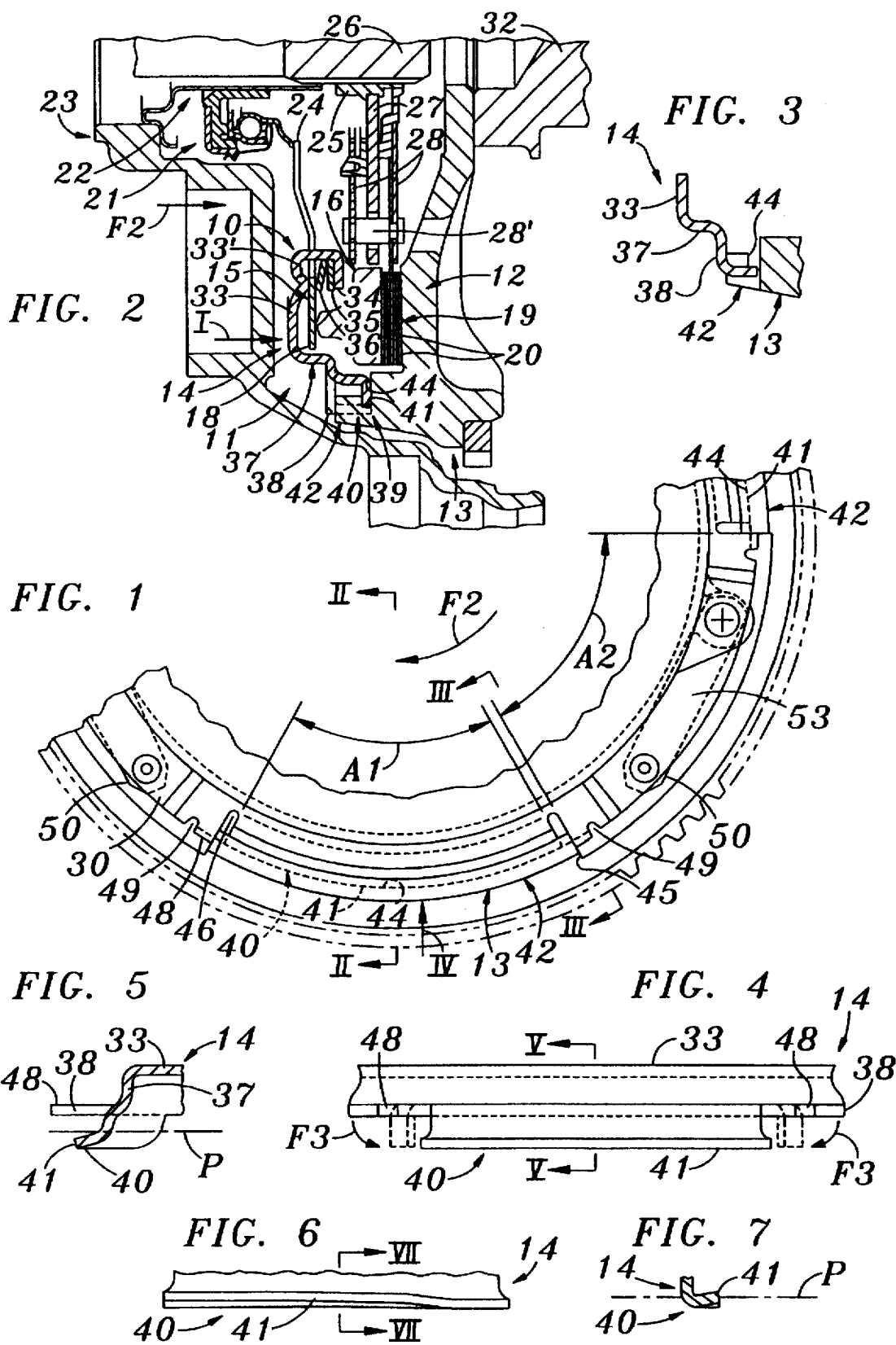

5,682,970

CLUTCH MODULE HAVING A COVER PLATE ATTACHED TO THE FLYWHEEL BY MEANS OF A BAYONET TYPE FITTING

BACKGROUND OF THE INVENTION

1. Field of the Invention

This invention relates to clutch modules, especially for motor vehicles.

2. Description of the Prior Art

As is known, a clutch module comprises, as a unitary assembly, a mechanism, a clutch friction wheel and a flywheel, the mechanism itself comprising, among other components, a cover plate by which it is attached on to the flywheel.

Conventionally, fastening of the cover plate on the flywheel is carried out by screwing, riveting, or seaming.

This then makes it necessary, either to form screw threads and/or holes in the components to be assembled together, or, in the case of seaming, to make use of complex tooling.

In order to overcome these disadvantages, it is proposed in the document GB-A-2 193 271 to provide an arrangement in which mounting means of the bayonet fitting type are interposed between the cover plate and the flywheel.

These means make use of apertures formed in the outer periphery of the flywheel, and U-shaped lugs formed in the cover plate.

The lugs are engaged in the apertures, and rotation is then effected in such a way that the said lugs embrace the outer periphery of the flywheel.

It is accordingly necessary to form a groove in the region of the starter crown which is carried by the flywheel, so as to accommodate the ends of the lugs of the cover plate.

That arrangement complicates the manufacture of the flywheel, and increases the radial size of the module.

An object of the invention is to provide a clutch module which enables these drawbacks to be avoided.

SUMMARY OF THE INVENTION

According to the invention, a clutch module of the type described above, in which the mounting means comprise on the cover plate at least two sectors elongated circumferentially and spaced apart on a circle, is characterised in that each of the sectors has a transversely projecting engagement lip over at least a part of its length, in that the said mounting means comprise on the flywheel an equal number of bosses, each of which, being elongated in the circumferential direction and being spaced apart from each other by an angle subtended thereby at the centre and being at least equal to the angle subtended by a sector of the cover plate, has, over at least a part of its length measured from one of its circumferential ends, a transverse groove with which the engagement lip of a said sector is in engagement, and in that the engagement lip of a sector of the cover plate extends radially away from the axis of the assembly, and in combination therewith, the groove of a of the flywheel is formed on the surface of the latter facing towards the said axis.

In all cases, by virtue of such mounting means, the assembly together of the mechanism and the flywheel essentially involves only a simple axial engagement of the mechanism on the flywheel, followed by relative rotation of the mechanism through a fraction of a turn with respect to the flywheel, as in the prior art.

It will however be appreciated that the flywheel is of a simple form, with its bosses being formed easily by casting, and that the lips of the cover plate are easily made by press-forming.

It is therefore not necessary to provide a recess in the region of the starter crown of the flywheel, and the cover plate does not extend beyond the outer periphery of the flywheel, so that the radial size of the module is reduced.

In addition, the cover plate has a reduced axial size as compared with that in the document GB-A-2 193 271 mentioned above. The material requirement is thus reduced.

However, preferably, in order to prevent rotation of the mechanism on the flywheel, there is associated with at least one of the sectors of the cover plate a lug which, being bent accordingly, is in circumferential abutting engagement against the corresponding boss of the flywheel, and it is then convenient to carry out the bending of this lug after assembly.

In all cases, advantageously, no seaming or threading and/or drilling is necessary for this assembly, nor any riveting or welding.

The said assembly therefore has the advantage that it calls for no special tooling.

It also enables the number of components that have to be stored to be reduced.

In addition, dismantling is possible by bending back the lug or lugs that prevent rotation.

Another advantage is that the cover plate is then able to be reused, with the lug or lugs being capable of being bent over again and therefore reused, which is not the case with rivets once the latter have been removed by drilling in order that the riveted assembly can be dismantled.

The features and advantages of the invention will appear more clearly from the description which follows, by way of example and with reference to the attached diagrammatic drawings, in which:

BRIEF DESCRIPTION OF THE DRAWINGS

FIG. 1, partly cut away in the middle, is a partial plan view of a clutch module in accordance with the invention, in the direction of the arrow I in FIG. 2;

FIG. 2 is a partial view in axial cross section taken on the line II—II in FIG. 1;

FIG. 3 is another partial view of the same, in axial cross section taken on the line III—III in FIG. 1, with some components omitted;

FIG. 4 is a partial side view of the single cover plate in the mechanism employed in the said clutch module, seen in the direction of the arrow IV in FIG. 1;

FIG. 5 is a partial view of the same cover plate, in axial cross section taken on the line V—V in FIG. 4;

FIG. 6 is a partial side view which partly repeats that in FIG. 4, and which relates to a modified embodiment of the cover plate;

FIG. 7 is a partial view of the same modified embodiment, in axial cross section taken on the line VII—VII in FIG. 6.

DETAILED DESCRIPTION OF THE PREFERRED EMBODIMENT

As is shown in the drawings, the clutch module 10 in accordance with the invention, which constitutes a unitary assembly, comprises, in axial succession and in a manner known per se, a mechanism 11, a clutch friction wheel 12 and a flywheel 13.

The mechanism 11 itself comprises, in axial succession, a cover plate 14, which is applied on the flywheel 13 as will be described later herein, a diaphragm 15 which bears on the cover plate 14, and a pressure plate 16 on which the diaphragm 15 bears.

The mechanism 11 is of the "push to release" type here.

The diaphragm 15 accordingly engages on the cover plate 14 on that side of the periphery that has the smaller diameter, of its peripheral portion 18 which constitutes a Belleville ring, whereas it engages on the pressure plate 16 on that side of the periphery of the latter that has the larger diameter.

Under the biassing action of the diaphragm 15, the pressure plate 16 is arranged to clamp against the flywheel 13 the friction liners 29 of the friction disc 19 which is part of the clutch friction wheel 12.

For the release of these friction liners 20, as shown in fine lines in FIG. 2, there is provided a clutch release bearing 21 which, being mounted for axial sliding movement on a sleeve 22 fixed to the casing 23 of the assembly, is adapted to exert a thrust on the fingers 24 defined in the central portion of the diaphragm 15.

In this example, the clutch friction wheel 12 has a damper hub.

Apart from a hub 25, by which it is adapted to be mounted in rotation on a driven shaft 26, which is more particularly the output shaft of the gearbox, and a hub plate 21, which is secured to the hub 25, in this example by seaming, it includes two guide rings 28, each of which lies, respectively, on either side of the hub plate 27, with the friction disc 19 being fixed to it, and with circumferentially acting resilient means, which are not shown in the drawings, being interposed circumferentially between the hub plate 27 and the said guide rings 28 and being located partly in windows of the hub plate 27 and partly in windows of the guide rings 28.

In this example, the friction disc 19 is attached to one of the guide rings 28, and it is secured to the latter by the same spacer bars 28' that secure it to the other one of the guide rings 28.

In this example the flywheel 13 is integral, being of mouldable material, and being in the present example a casting.

However, in a modification it could equally well be a flywheel of the "divided" type, that is to say a flywheel which is in two parts.

The flywheel 13 is adapted to be carried, by fastening screws which are not shown in the drawings, on a driving shaft 32, more particularly the crankshaft of an internal combustion engine.

The flywheel 13 carries at its outer periphery (FIG. 2) a starter crown (which has no reference numeral), adapted to be driven by the starter of the vehicle in the known way.

In this example the cover plate 14 of the mechanism 11 is a sheet steel pressing, and it includes a transverse, annular base portion 33 which provides, in this example in the form of a bead 33' made by press-forming, a primary abutment for the peripheral portion 18 of the diaphragm 15, defining a Belleville ring, on a first side of the latter, with lugs 34 extending from the bead and providing a secondary abutment for the said peripheral portion 18 on the other side of the diaphragm, through a spacing ring 35 and a resilient ring 36.

The diaphragm 15 is thus mounted for pivoting movement on the cover plate 14.

The cover plate 14 also includes a peripheral side wall 37, with which it surrounds the diaphragm 15.

In this example, the cover plate 14 includes a flange 38 which extends, again transversely, radially away from the base portion 33 and therefore away from the axis of the assembly, and through which it bears axially on the flywheel 13.

Mounting means 39 of the bayonet type are interposed between the cover plate 14 and the flywheel 13, for attaching the cover plate 14 to the flywheel 13.

In accordance with the invention, these mounting means 39 comprise, firstly on the cover plate 14, at least two sectors 40 which are elongated circumferentially and are spaced apart in a circular sense around the axis of the assembly, and each of which has a transversely projecting engagement lip 41 over at least part of its length, and secondly, an equal number of bosses 42 on the flywheel 13, each of which, being elongated in the circumferential direction and being spaced apart from each other so as to subtend an angle A2 at the centre which is at least equal to the angle A1 subtended by a sector 40 of the cover plate 14, being in practice slightly greater than the latter, has a transverse groove 44 over at least part of its length measured from one of its circumferential ends, with the engagement lip 41 of a said sector 40 being in engagement with this groove.

In this example, the cover plate 14 comprises three sectors 40, spaced apart at regular intervals of 120° from each other around the axis of the assembly, and in combination with these the flywheel 13 has three corresponding bosses 42, which are readily formed by moulding, being of axial orientation.

The sum of the corresponding angles A1, A2 subtended at the centre is substantially equal to 120 degrees, though it is slightly smaller than this value.

In this example of the invention, the engagement lip 41 of the sectors 40 of the cover plate 14 extends radially away from the axis of the assembly, and in combination with this, the groove 44 of the bosses 42 of the flywheel 13 is formed on the surface of the latter that faces towards the said axis. It will be appreciated that the lip 41 is easily obtained by press-forming, and that the bosses 42 extend axially towards the base portion 33 of the cover plate 14.

In this example, the engagement lip 41 extends over the whole length of the sectors 40, and similarly the groove 44 of the bosses 42 extends from one of their circumferential ends to the other.

In this example, the sectors 40 of the cover plate 14 are turned edges, each of which is formed in a slot 45 in the flange 38 of the cover plate 14, being separated from the edges of the said slot 45 by notches 46 facilitating their pressing and bending, with the turned edges extending in a generally axial direction.

In combination with the foregoing, the bosses 42 of the flywheel 13 project axially at its outer periphery, and it is on these bosses 42 that the flange 38 of the cover plate 14 bears.

In this example, the engagement lip 41 of the sectors 40 of the cover plate 14 extends, at least locally, slightly obliquely with respect to a plane P at right angles to the axis of the assembly, and for example with respect to the plane P passing through its root, FIG. 5.

For example, FIGS. 4, 5, the said engagement lip 41 extends obliquely over its whole length, being spaced away from the plane P to the extent that it extends away from the axis of the assembly.

The general result of this is that a said engagement lip 41 departs slightly from a parallel relationship with respect to the flange 38.

In a modification, FIGS. 6, 7, the engagement lip 41 extends slightly obliquely with respect to the plane P over only one portion of its length. Over the remainder of the latter, it extends at right angles to the axis of the assembly.

At least one lug 48 is associated with at least one of the sectors 40 of the cover plate 14, and, being bent accordingly, is in circumferential abutting engagement against the corresponding boss 42 of the flywheel 13, in order to prevent rotation of the said cover plate 14 on the flywheel 13. In this example, there is one lug 48 at each of the circumferential ends of each of the sectors 40.

Initially, FIGS. 5, 6, this lug 48 extends radially away from the axis of the assembly as an extension of the flange 38, being, as before, separated from the main portion of the flange 38 by a notch 49, FIG. 1.

In a manner known per se, the pressure plate 16 is secured to the cover plate 14 for rotation with it, while being movable axially with respect to the latter.

In this example it is attached to the cover plate 14 by means of tongues 50, which are spaced apart on a circle around the axis of the assembly, and which are disposed transversely with respect to the latter, with each tongue extending between, firstly, the flange 38 of the cover plate 14, and secondly, a lug 51 which projects radially from the periphery of the pressure plate 16.

For accommodating these tongues 50, and also for accommodating the lugs 51 of the pressure plate 16 and the corresponding rivets, the flange 38 of the cover plate 14 has, in the region of the said tongues 50, local press-formed zones 53 which are offset axially towards the base portion 33 of the cover plate 14, which prevents any interference with the bosses 42 of the flywheel 13 during the assembly operation.

During assembly, that is to say when the mechanism 11 is fitted in position, the cover plate 14 is engaged axially on the flywheel 13 in the direction of the arrow F1 in FIG. 2, with its sectors 40 between the bosses 42 of the said flywheel 13; the lugs 48 are then straight.

The cover plate 14 is then rotated through a fraction of a turn with respect to the flywheel 13, in the direction of the arrow F2 in FIG. 1, with the engagement lip 41 of its sectors 40 engaging in the groove 44 in the bosses 42 of the flywheel 13.

Having regard to the oblique orientation of the said engagement lip 41, at least locally, such engagement preferably takes place with a slight pinching effect, which is enough to ensure retention of the cover plate 14, and therefore of the mechanism 11, on the flywheel 13.

At the end of the assembly operation thus carried out, the lugs 48, which are of metal, like the cover plate 14 of which they are part, are bent over at right angles as is indicated in broken lines in FIG. 4, in the direction of the arrows F3 in the latter, and this positively prevents rotation of the cover plate 14, and therefore of the mechanism 11, on the flywheel 13.

Disassembly does however always preferably remain possible.

In this connection, it is sufficient to bend back the lugs 48, and then to dismantle the assembly in accordance with a procedure which is the opposite of the foregoing.

The present invention is of course not limited to the embodiment described and shown, but embraces all practical variations thereof.

In particular, instead of using lugs 34 formed integrally with the cover plate 14, the assembly means which attach the diaphragm 15 pivotally to the cover plate 14 may employ small bars, in the manner described for example in the document FR-A-1 524 350 (U.S. Pat. No. 3, 499, 512).

In addition, instead of being obtained by means of tongues, the coupling of the pressure plate 16 with respect to the cover plate 14, for rotation together but with axial mobility, may be of the tenon and mortice type as described in the document FR-A-2 463 874 (U.S. Pat. No. A 4, 362, 230), the pressure plate 16 then having, for example, radially projecting lugs in engagement with apertures which are formed for this purpose in the side wall 37 of the cover plate 14.

In that case, the flange 38 of the cover plate 14 has no need to have the press-formed zones 53.

In a modification, it is possible, with the same end in view, to reduce the angle A1 subtended at the centre by the sectors 40 of the cover plate 14.

It will be appreciated that the flywheel 13 comes very close to the casing 23 (FIG. 2), and that the cover plate 14 does not extend radially between the casing 23 and the flywheel 13, and this enables the radial size of the module to be reduced.

It will be noted that the bosses 42 lie radially outside the pressure plate 16, and that the flywheel 3 is not modified in the region of its starter crown, which can be seen in FIG. 2 and which is not given a reference numeral.

I claim:

1. A clutch module comprising a mechanism (11), a clutch friction wheel (12), and a flywheel (13), said mechanism (11) itself comprising a cover plate (14) by which it is attached on the flywheel (13) in which mounting means (39) of the bayonet fitting type are interposed between the cover plate (14) and the flywheel (13), and comprise, on the cover plate (24), at least two sectors (40) which are elongated in the circumferential direction and spaced apart on a circle so as to subtend an angle (A1) at the center, wherein each of the sectors (40) have a transversely projecting engagement lip (41) over a least a part of its length, and in addition, on the flywheel (13), an equal number of bosses (42), each of which, being elongated in the circumferential direction and being spaced apart from each other by an angle (A2) subtended thereby at the center and being at least equal to the angle (A1) subtended by a sector (40) of the cover plate (14), each of said bosses having, over at least a part of its length measured from one of its circumferential ends, a transverse groove (44) with which the engagement lip (41) of a said sector (40) is in engagement, and in that the engagement lip (41) of a sector (40) of the cover plate (14) extends radially away from the axis of the assembly, and in combination therewith, said groove (44) being formed on the surface of the boss facing towards said axis.

2. A clutch module according to claim 1, wherein the engagement lip, (41) of a sector (40) of the cover plate (14) extends, at least locally, obliquely with respect to a plane (P) at right angles to the axis of the assembly.

3. A clutch module according to claim 1, wherein there is associated with at least one of the sectors (40) of the cover plate (14) a lug (48) which, being bent accordingly, is in circumferential abutting engagement against the corresponding boss (42) of the flywheel (13).

4. A clutch module according to claim 1, wherein the cover plate (14) comprises three sectors (40), and the flywheel (13) has four bosses (42).

5. A clutch module according to claim 1, wherein the cover plate (14) has a transverse flange (38) for its axial abutting engagement on the flywheel (13), the sectors (40) being turned edges, each of which is formed in a slot (45) of the said flange (38), and which extend generally axially.

6. A clutch module according to claim 1, wherein the bosses (42) of the flywheel (13) project axially adjacent an outer periphery of the flywheel.

* * * * *